US012698183B2

(12) United States Patent
Zhou-Kangas et al.

(10) Patent No.: US 12,698,183 B2
(45) Date of Patent: Aug. 4, 2026

(54) ELICITING PREFERENCES FOR PASSENGER TRAFFIC GROUP CONTROL

(71) Applicant: KONE Corporation, Helsinki (FI)

(72) Inventors: Yue Zhou-Kangas, Helsinki (FI); Juho Kokkala, Helsinki (FI); Mirko Ruokokoski, Helsinki (FI); Juha-Matti Kuusinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1071 days.

(21) Appl. No.: 17/854,537

(22) Filed: Jun. 30, 2022

(65) Prior Publication Data

US 2022/0324675 A1 Oct. 13, 2022

Related U.S. Application Data

(63) Continuation of application No. PCT/FI2020/050086, filed on Feb. 12, 2020.

(51) Int. Cl.
*B66B 1/34* (2006.01)

(52) U.S. Cl.
CPC .......... *B66B 1/3453* (2013.01); *B66B 1/3423* (2013.01)

(58) Field of Classification Search
CPC ...... G06Q 10/00; B66B 1/3423; B66B 1/3453
USPC .......................................................... 187/391
See application file for complete search history.

(56) References Cited

U.S. PATENT DOCUMENTS 5,307,903 A * 5/1994 Morita ...................... B66B 1/18 187/382
6,315,082 B2 * 11/2001 Hikita .................. B66B 1/2458 187/382
6,345,697 B1 * 2/2002 Siikonen .............. B66B 1/2458 187/382
2001/0010278 A1 8/2001 Hikita
(Continued)

FOREIGN PATENT DOCUMENTS

CN 1325360 A 12/2001
JP 1-236178 A 9/1989
(Continued)

OTHER PUBLICATIONS

International Search Report, issued in PCT/FI2020/050086, dated Apr. 9, 2020.
(Continued)

*Primary Examiner* — Jorge L Carrasquillo
(74) *Attorney, Agent, or Firm* — Birch, Stewart, Kolasch & Birch, LLP

(57) ABSTRACT

Various example embodiments relate to control of passenger traffic group systems. In particular, some example embodiments relate to eliciting user preferences for call allocations for the passenger traffic group system. At least one user preference may be considered when determining a set of candidate control parameters for the passenger traffic group system. At least one representative of the operation of the passenger traffic group system may be displayed to the user based on a simulation of the passenger traffic group system. The user may be enabled to accept the candidate control parameters or modify the user preferences to generate a further set of candidate control parameters. Apparatuses, methods, and computer programs are disclosed.

31 Claims, 6 Drawing Sheets

(56) References Cited

U.S. PATENT DOCUMENTS

2010/0174509 A1 7/2010 Raghunathan et al.
2019/0106289 A1* 4/2019 Kuusinen .............. B66B 1/3446

FOREIGN PATENT DOCUMENTS

JP 5-777 A 1/1993
JP 2000-318938 A 11/2000

OTHER PUBLICATIONS

Written Opinion of the International Searching Authority, issued in PCT/FI2020/050086, dated Apr. 9, 2020.

* cited by examiner

ELICITING PREFERENCES FOR PASSENGER TRAFFIC GROUP CONTROL

CROSS REFERENCE TO RELATED APPLICATIONS

This application is a Continuation of PCT International Application No. PCT/FI2020/050086, filed on Feb. 12, 2020, which is hereby expressly incorporated by reference into the present application.

TECHNICAL FIELD

Various example embodiments generally relate to the field of passenger traffic systems, and more particularly to a method, an apparatus, a computer program, and a computer-readable medium for eliciting preferences for passenger traffic group control.

BACKGROUND

If multiple objectives are processed simultaneously in a passenger traffic group control system, there may be a set of Pareto optimal call allocations that represent different compromises between the objectives. A call allocation is Pareto optimal if it is impossible to improve one objective without impairing at least one of the other objectives. Desired objectives may depend on preferences of stakeholders, such as for example customer representatives and passengers of the system. A passenger traffic group control system may be configured to take into account the desired objectives, for example when determining call allocations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to elicit preferences for passenger traffic group control. This objective may be achieved by the features of the independent claims. Further implementation forms are provided in the dependent claims, the description, and the drawings.

According to a first aspect there is provided a method comprising: receiving an indication of at least one user preference for a passenger traffic group system; determining a set of candidate control parameters for the passenger traffic group system, in response to receiving the at least one user preference; obtaining a simulation result of the passenger traffic group system based on the set of candidate control parameters; and outputting at least one representative of the operation of the passenger traffic group system based on the simulation result.

According to an example embodiment, the method may further comprise sending the set of candidate control parameters to a passenger traffic group controller for configuration at the passenger traffic group system, in response to receiving a user acceptance of the set of candidate control parameters.

According to an example embodiment, the method may further comprise iteratively repeating receiving the indication of at least one user preference, determining the set of candidate control parameters, obtaining the simulation result, and outputting the at least one representative of the simulation result until receiving the user acceptance.

According to an example embodiment, the indication of the at least one user preference may be received based on a graphical user interface comprising at least one user interface element for inputting a relative importance of at least two user preference parameters. The at least one user preference may comprise an indication of a relative importance between energy consumption and at least one performance indicator.

According to an example embodiment, outputting the at least one representative of the operation of the passenger traffic group system may comprise displaying the at least one representative of the operation of the of the passenger traffic group.

According to an example embodiment, the at least one representative of the operation of the passenger traffic group system comprises at least one of: an average waiting time, a distribution of waiting time, an average time to destination, a distribution of time to destination, or an energy consumption.

According to an example embodiment, obtaining the simulation result may further comprise sending a simulation request to a simulation server and receiving the simulation result from the simulation server.

According to an example embodiment, the simulation result may be obtained based on the set of candidate control parameters and at least a traffic profile of the passenger traffic group system.

According to an example embodiment, the set of candidate control parameters may comprise weights of a linear utility function.

According to an example embodiment, the method may further comprise determining the set of candidate control parameters based on the at least one user preference.

According to an example embodiment, the method may further comprise: determining at least two sets of candidate control parameters for the passenger traffic group system, obtaining at least two simulation results of the passenger traffic group system based on the at least two sets of candidate control parameters, and outputting at least two representatives of the operation of the passenger traffic group system based on the at least two simulation results. The indication of the at least one user preference may comprise a user selection from the at least two representatives of the simulation at least two results.

According to an example embodiment, the method may further comprise initiating a probability model associated with sets of control parameters, and updating the probability model based on the user selection from the at least two representatives of the at least two simulation results.

According to an example embodiment, the method may further comprise determining whether the probability model satisfies at least one convergence criterion, selecting a set of control parameters based on the probability model, and sending the set of control parameters to a passenger traffic group controller for configuration at the passenger traffic group system.

According to a second aspect there is provided an apparatus configured to perform any example embodiment of the method of the first aspect.

According to a third aspect, there is provided a computer program comprising program code which, when executed by at least one processor, causes an apparatus to perform any example embodiment of the first aspect.

According to an example embodiment, the computer program is embodied on a computer-readable medium.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
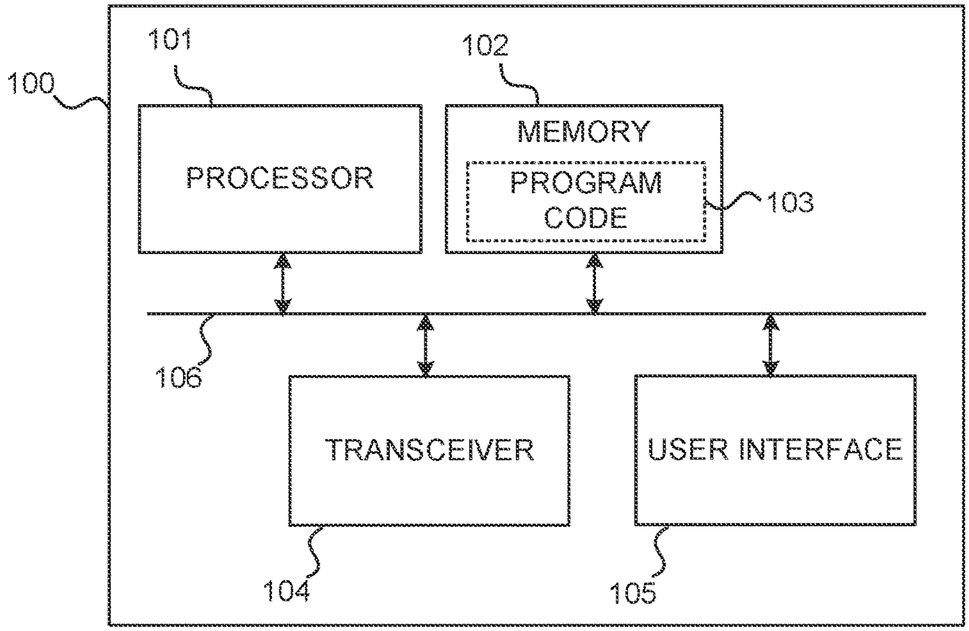
FIG. 1 illustrates a block diagram of an apparatus, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions, sequences, or structures may be accomplished by different example embodiments.

Passenger traffic systems such as elevator systems in high-rise buildings may comprise group(s) of passenger traffic group members, for example elevators, with a centralized group control. In passenger traffic group control, a call allocation may refer to allocation of tasks between the passenger traffic group members in order to fulfil multiple user requests such that one or more performance criteria are satisfied or optimized. For example, in an elevator group system, selecting a particular call allocation may cause particular elevators of an elevator group to pick up passengers at particular floors. This results in certain system behavior, which may be optimized with respect to the performance criteria. This problem can be viewed as a combination of online scheduling, resource allocation, and stochastic control.

One performance criterion to be considered when scheduling passenger pick-ups is the waiting time (WT), for example an average waiting time of all or a group of passengers in the system. A waiting time may comprise a time period from when the passenger either registers a landing call, or joins a queue, until the responding elevator begins to open its doors at the boarding floor. One or more alternative and/or additional performance criteria may be used as well. One example of such criterion is the transit time, which may comprise the time from when a responding elevator begins to open its doors at the boarding floor until the doors begin to open again at the destination floor. Other examples include the percentage of waiting times exceeding a certain limit or the number of elevator stops, which may be related to energy consumption. The energy consumption (EC) may be alternatively, or additionally, used as a performance criterion as such. Another performance criterion may comprise the time to destination, which may comprise a sum of the waiting time and the transit time. Further performance criteria, such as for example a journey time, a may be used as well.

Considering two or more of the performance criteria simultaneously results into a multi-objective optimization problem, where the group control algorithm may be tuned in order to find a satisfactory compromise between the different performance criteria. In one example, a utility function may be used to combine the criteria to evaluate and/or optimize behavior of the passenger traffic system. A linear utility function may comprise a linear combination of the performance criteria. Based on reasonable weights for the linear combination, the system may illustrate how preference values affect the utility function and consequently operations of the elevator or the elevator group.

Call allocation decisions may be made in real-time without any input from a decision maker. It may be therefore desirable to get preference information from the stakeholders beforehand and to apply it independently when making the call allocation decisions. Another challenge is that the stakeholders are not expected to be able to input the preferences in a form used by the optimizer in the passenger traffic group controller, such as importance weights or the utility function. It may be therefore desired to show the customer the meaning and impact of their choices in an understandable manner.

Example embodiments presented herein enable learning stakeholders' preferences and applying the preferences in passenger traffic group control. This way the stakeholders' long-term preferences may be reflected in the call allocation decisions. Furthermore, the customer may be provided with an informative user interface for configuring the passenger traffic group.

According to an example embodiment, an apparatus, method, and a computer program for eliciting user preferences for call allocations for a passenger traffic group system, for example an elevator group, are disclosed. At least one user preference may be considered when determining a set of candidate control parameters for the passenger traffic group system. Furthermore, at least one representative of the operation of the passenger traffic group system may be displayed to the user based on a simulation of the passenger traffic group system. The user may therefore conveniently observe how input user preference(s) affect the operation of the passenger traffic group system. The user may be enabled to accept the candidate control parameters or modify the user preferences to generate a further set of candidate control parameters.

FIG. 1 illustrates a schematic representation of an apparatus 100, according to an example embodiment. The apparatus may for example comprise control device of the passenger traffic system. The apparatus 100 may comprise at least one processor 101. The apparatus 100 may further comprise at least one memory 102. The processor 101 may be configured to perform the configured operations and functions according to a program code 103 comprised in the memory 102. Example embodiments of the operations and functions are described below. Example embodiments may be implemented as computer software, or a programmable hardware logic, or a combination of these. The apparatus 100 may further comprise a transceiver 104. The transceiver 104 may be configured to, for example, transmit and/or receive data using wireless or wired connection(s). The transceiver 104 may be configured to transmit and/or receive data to/from other devices or functions of the passenger traffic group system. The apparatus 100 may further comprise a user interface 105. The user interface 105 may comprise a graphical user interface (GUI). The user interface may comprise an input device and/or an output device. The input device may take various forms such as for example a keyboard, a touch screen, and/or one or more virtual or physical control buttons. The output device may for example comprise a display, a speaker, or the like. The aforementioned components 101 to 105 may be connected to one or more of the other components, for example via a data bus 106, or in any other suitable manner. The apparatus 100 may be partly implemented as a cloud service or a computer device.

Figure 2:
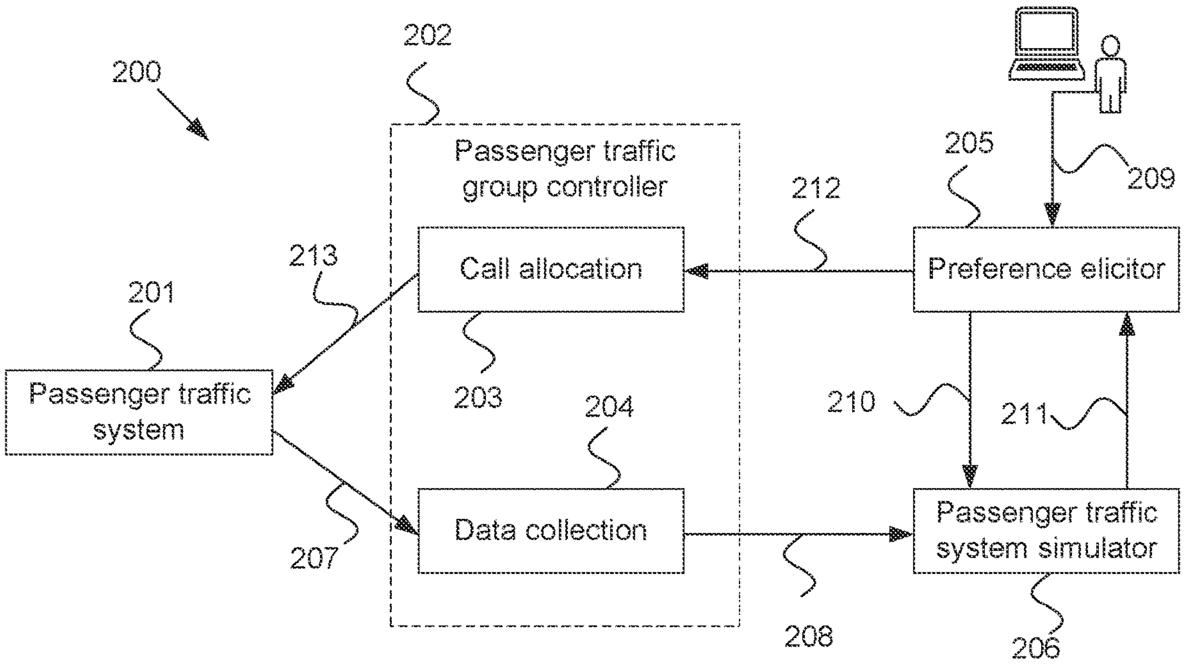
FIG. 2 illustrates a block diagram of a passenger traffic group control system, according to an example embodiment.

FIG. 2 illustrates a block diagram of a passenger traffic group control system 200, according to an example embodiment. The passenger traffic control system 200 may comprise the passenger traffic system 201, which may comprise one or more passenger traffic groups such as for example group(s) of elevators and/or escalators. The passenger traffic system 201 may comprise necessary equipment, hardware, and/or software to operate the passenger traffic system, for example based on call allocation data 213 received from a passenger traffic group controller 202.

A service level of the passenger traffic group system 201 may be associated to, for example, waiting times experienced by passengers. A change in quality of the service level may comprise at least one of an increase in average waiting times, an increase in peak waiting times, an increase in journey times or time to destination (TTD), changed origin-destination flows, or less or no passengers using one or more sections of the passenger traffic system 201.

The passenger traffic group controller 202 may comprise a call allocation function 203 responsible of call allocation tasks associated with the passenger traffic group(s), as discussed above. The call allocation function may communicate with the passenger traffic system 201, for example to send call allocation data 213 to the passenger traffic system 201. The call allocation data may for example comprise command(s) for one or more elevators to pick up passengers at particular floor(s).

The passenger traffic group controller 202 may further comprise a data collection function 204, which may be configured to receive operational data 207 from the passenger traffic system 201. The operational data 207 may be received for example from or via equipment comprising, for example, a control unit of the passenger traffic system 201, a sensor, and/or any other device of the passenger traffic system 201.

In general, the passenger traffic group controller 202 may be configured to communicate with the passenger traffic system 201 over one or more communication interfaces, which may for example comprise one or more wired or wireless external connections, or internal interface(s) if the passenger traffic group controller 202 is integrated within the passenger traffic system 201.

The operational data 207 may comprise for example information on at least one of elevator movements, elevator calls, counts of passengers exiting elevator(s), counts of passengers entering elevator(s), origin-destination counts, or observed equipment faults. The operational data 207 associated with the passenger traffic system equipment may pertain to behavior of the equipment, but also to behavior of the passengers and calls. For example, timestamped information about calls and passengers entering/exiting elevators may be used to measure waiting times and/or journey times as observed by the passengers.

Based on the operational data 207 received from the passenger traffic system 201, the data collection function 204 may be configured to determine passenger traffic system data 208, such as for example at least one traffic profile, at least one traffic pattern, or elevator parameter(s) of the passenger traffic system 201. The data collection function 204, or in general the passenger traffic group controller 202, may be configured to send the passenger traffic system data 208 to the passenger traffic system simulator 206, for example over a wireless or wired communication interface.

According to an example embodiment, a passenger traffic group controller device or function comprises both the call allocation function 203 and the data collection function 204. It is however possible that the call allocation function 203 and the data allocation function 204 are functionally, logically, or physically separate. For example call allocation function 203 and data collection function 204 may be embodied in separate devices. The passenger traffic group controller 202, or one or more components thereof, may be also integrated within the passenger traffic system 201.

The passenger traffic group control system 200 may further comprise a preference elicitor 205, which may be for example comprised in apparatus 100, or be downloadable or otherwise transferable to apparatus 100, for example as program code. The performance elicitor 205 may be configured to receive user input from a user, for example an operator of the passenger traffic system 201. The user input may comprise one or more user preference parameters 209. The user preference parameters 209 may for example comprise a numeric representation of the user preferences, such as a vector of weights or a reference point of adequate levels for the criteria to be processed in the preference elicitor 205. The preference elicitor 205 may be further configured to communicate with the passenger traffic system simulator 206, for example to send one or more candidate control parameters 210 to the simulator 206 and/or to receive simulation result data 211 from the simulator 206. The preference elicitor may be configured to determine the one or more candidate control parameters 210 based on the one or more user preference parameters 209. The simulation result data 211 may for example comprise predicted outputs such as for example representatives of the simulated operation of the passenger traffic group system 201.

The preference elicitor 205 may be configured to communicate with the passenger traffic system simulator 206 over one or more communication interfaces, which may for example comprise one or more wired or wireless external connections, or internal interface (s) if the simulator 206 is integrated with the preference elicitor 205. According to an example embodiment, the simulator 206 may be located on a server, which may be remotely accessed by the preference elicitor 205 over a communication network such as for example the internet.

The passenger traffic system simulator 206 may comprise a computational model of the passenger traffic system 201. The simulator 206 may for example comprise an elevator model and a traffic generation model. The simulator may further comprise a model of the call allocation function 203 or the passenger traffic group controller 202. The simulator 206 may be further configured with one or more prerequisites for modelling operation of the passenger traffic system 201. For example, an elevator of the model may be configured not to pass a floor at which a passenger wishes to get off. An elevator may be configured to fulfill its current commitment and not reverse direction with passengers aboard. An empty elevator may be configured to stop, go up, or go down. An elevator may be associated with parking or returning algorithm such that the elevator is sent to a predetermined floor for future calls. Flight times of elevators may be modeled based on distances between floors, constant acceleration and maximum speed of the elevators. The model may comprise fixed delays for door openings, closings, and/or passenger transfers. If the number of queuing passengers exceeds a threshold, an elevator may be filled up to a rated load. The elevator model may include one or several entrance floors, the rest of floors being considered as populated floors. The passengers may be configured to arrive at different floors according to a Poisson process, or a compound Poisson process where passenger groups arrive according to a Poisson process. Alternatively, a Poisson process or a compound Poisson process may be defined for each origin-destination pair. Instead of or in addition to random traffic generation, observed or measured real traffic can be used, when the system is in operation already. For example inter-arrival times of passengers may be configured to follow an exponential distribution $f(x)=\lambda e^{-\lambda x}$, where $\lambda$ is the arrival rate. Incoming passengers may be configured to travel from an entrance floor to populated floors. Behavior of outgoing and inter-floor passengers may be determined by traffic parameters. Furthermore, behaviour of incoming passengers may be determined by traffic parameters and outgoing passenger may be configured to travel from populated floors.

In general, the simulator 206 may take as an input the one or more control parameters and passenger traffic system data 208, for example a traffic pattern. The simulator may further take as an input a seed for random traffic generation. Based on the input data, the simulator 206 may provide the simulation result data 211, which may be determined as a function of the input data.

The one or more control parameters may be provided to the simulator 206 for example as a utility function, or parameters thereof. A utility function may reflect relative importance of a plurality of performance criteria. A target of the call allocation function 203 may be to maximize the utility function, or an expected value thereof. Alternatively, the call allocation function 203 may be configured to minimize a loss function. In general, the call allocation function 203 may be configured to optimize an objective function. For example, a linear utility function may be used for combining different performance criteria based on weights assigned to different criteria. For example, in a four-criterion problem, the utility function may be formulated as $U=-w_1x_1-w_2x_2-w_3x_3-w_4x_4$, where weights $w_1$ to $w_4$ reflect importance of the different performance criteria $x_1$ to $x_4$. For example, $x_1$ may comprise an average waiting time, $x_2$ may comprise an average transit time, $x_3$ may comprise a percentage of waiting times exceeding a threshold, and $x_4$ may comprise a number of stops. Alternatively, or additionally, an average time to destination may be used as one of the performance criteria $x_n$. Even though the utility function may provide a suitable format for inputting the control parameters to the simulator 206, the utility function may not be a desired format for a person responsible for configuring the passenger traffic system. Therefore, example embodiments described herein provide an abstraction of the control parameters, for example the utility function, such that the person responsible for configuring the passenger traffic system is enabled to enter user preferences in a more intuitive manner.

The passenger traffic system simulator 206 may receive the system data 208 from the data collection function 204, or in general the passenger traffic group controller 202. As discussed above, the system data 208 may for example comprise a traffic pattern that demonstrates various information relating to the operation of the passenger traffic group system 201. Based on the system data 208 and the candidate control parameters 210, the simulator 206 may simulate operation of the passenger traffic system 201 and provide the simulation result data 211 to the preference elicitor 205.

Figure 3:
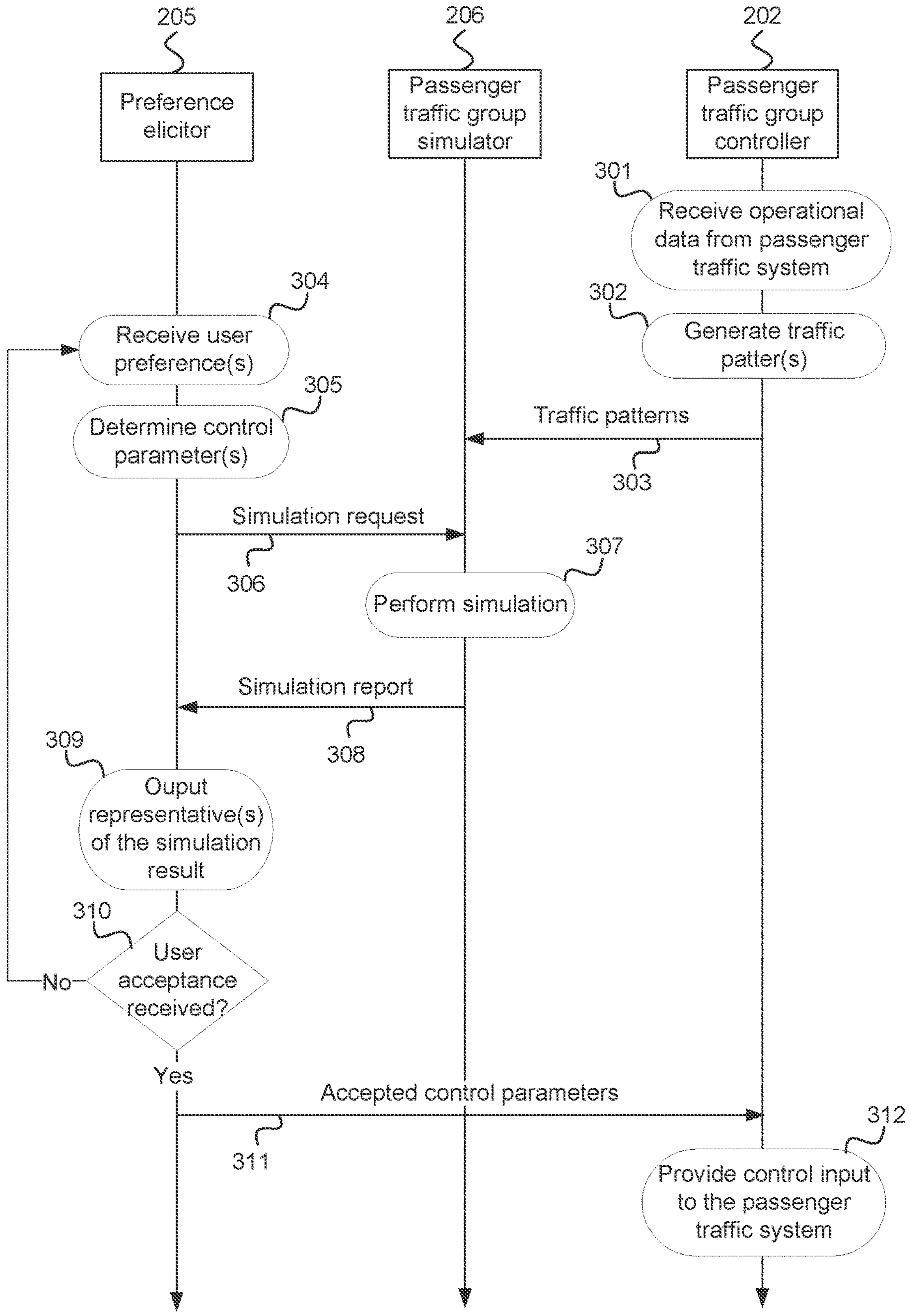
FIG. 3 illustrates an example of a method for eliciting preferences for a passenger traffic group system based on a user preference(s), according to an example embodiment.

FIG. 3 illustrates an example of a method for eliciting preferences for a passenger traffic group system based on user preference(s), according to an example embodiment.

At 301, the passenger traffic group controller 202 may receive operational data 207 from the passenger traffic system 201, as discussed above.

At 302, the passenger traffic group controller 202 may determine system data 208, for example by generating traffic pattern(s), based on the operational data 207 received from the passenger traffic system 201.

At 303, the passenger traffic group controller 202 may send the system data 208, for example the traffic pattern(s) to the passenger traffic group simulator 206. The system data 208 may further comprise other elevator related parameter data such as for example speed, or the like.

At 304, preference elicitor may receive an indication of at least one user preference for the passenger traffic group system. The indication of the user preference may be for example received at user interface 105, or via transceiver 104 if the user accesses the preference elicitor 205 remotely. The indication of the at least one user preference may comprise at least one user preference parameter for the passenger traffic group system. The user preference(s) may be provided in a format that is understandable to the user. For example, instead of complex parameters used internally at simulator 206, the user preferences may for example comprise a simple trade-off between maximum performance and energy consumption.

Figure 4:
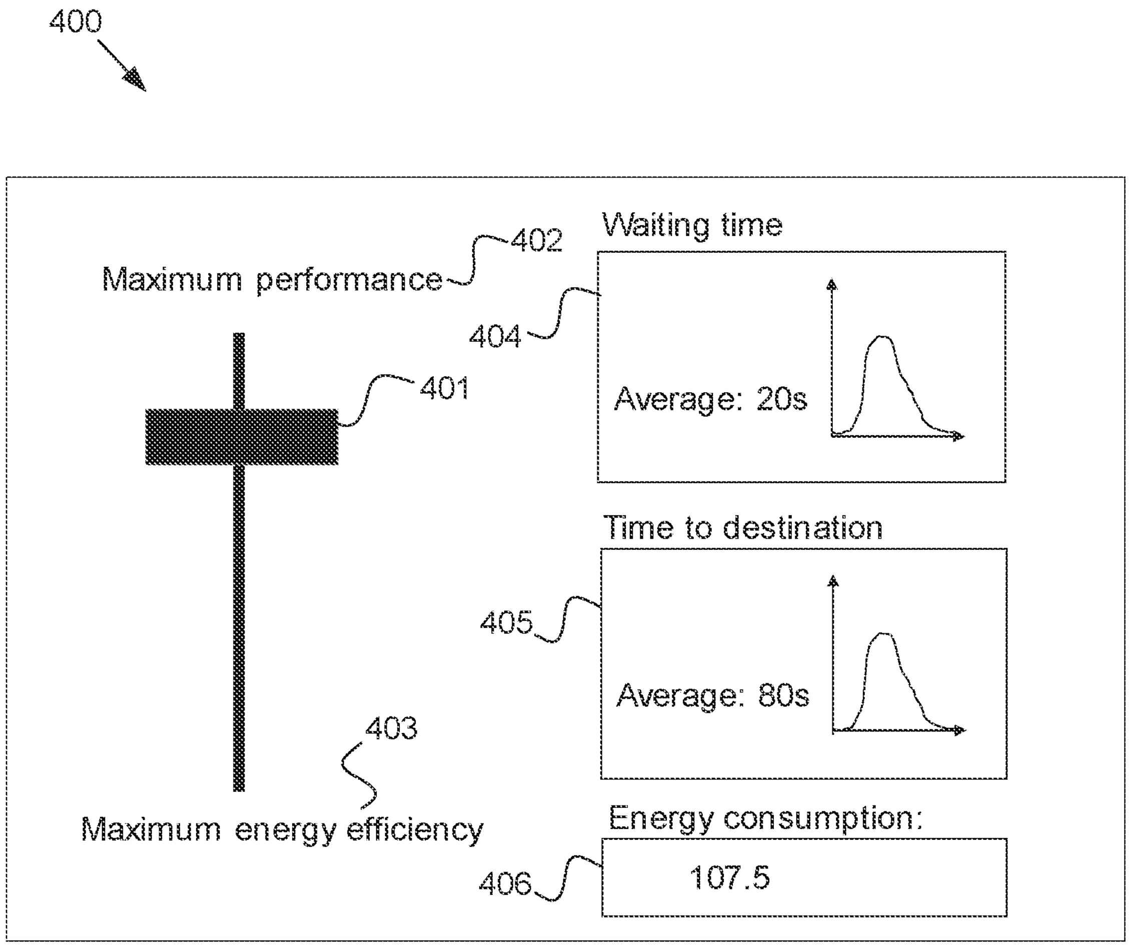
FIG. 4 illustrates an example of a configuration of a user interface configured for eliciting preferences for a passenger traffic group system, according to an example embodiment.

FIG. 4 illustrates an example of a configuration of a user interface configured for eliciting preferences for a passenger traffic group system, according to an example embodiment. User interface 400 of the preference elicitor 205 may be used for providing the indication of the at least one user preference. The user interface 400 may for example comprise a slider element 401, or other user interface element (s), for indicating a relative importance between at least two user preference parameters, for example maximum performance 402 and maximum energy efficiency 403, or other key performance indicators (KPI). The slider element 401 may be configured to provide the relative importance as value x, which may be for example be in the range of [0, 1], where "1" may be interpreted as configuration for full performance and "0" may be interpreted as configuration for full energy efficiency. In general, the indication of the relative importance may comprise a preference parameter value x, where relative importance of a performance indicator increases when the preference parameter value x increases, and where relative importance of energy consumption increases when the preference parameter value x decreases.

Even though the graphical slider element 401 is provided as an example of a user interface element, it is appreciated that any other suitable means for indicating user preference (s) may be used instead, or in addition to, the slider element 401. For example instead of indicating relative importance between preference parameters, the user interface 400 may comprise elements for individually indicating importance of a plurality of user preference parameters. The preference elicitor 205 may be configured to determine the relative importance based on the individual importance indications, or the preference elicitor 205 may use the individual importance indicators when determining candidate control parameters. It is also appreciated that even though only one slider element 401 is illustrated in FIG. 4, the user interface 400 may comprise a plurality of slider elements, or other user interface element(s), for providing a plurality of relative importance values between various user preference parameters.

Referring back to FIG. 3, at 305 the preference elicitor 205 may determine a set of candidate control parameters for the passenger traffic group system 201. The set of candidate control parameters may be determined in response to the at least one user preference for the passenger traffic group system 201, for example in response to receiving the indication of the user preference(s).

The set of candidate control parameters may be determined based on the at least one user preference for the passenger traffic group system. The set of candidate control parameters may comprise control parameters representative of the user preference(s). The control parameters may be however provided in a format that is more appropriate for the simulator 206. The set of candidate control parameters may comprise one or more candidate control parameters. Mapping between the user preference parameter(s) and the set of candidate control parameters may be predefined.

According to an example embodiment, the set of candidate control parameters may comprise parameter(s) of a utility function, for example weights of a linear utility function. In a weighted-sum based optimization the utility function may take the form of $U=-w_1x_1-w_2x_2-w_3x_3$, where $x_1$ may be associated with energy consumption, $x_2$ may be associated with average waiting time, and $x_3$ may be associated with average journey time, or, average time to destination. The slider element 401 may be configured to provide the relative importance as preference parameter value x in the range of [0,1]. According to an example embodiment, the mapping between the user preference parameter value x and the weights of the utility function U may be determined for example by on $w_1=1-x$, $w_2=0.5x$, and $w_3=0.5x$. This enables the preference elicitor 205 to provide the received user preference(s) as parameters of the utility function to the simulator 206. The above mapping provides the user with an intuitive one-dimensional slider user interface, even though the performance component of the optimization problem may be at the simulator 206 associated with multiple performance criteria, in this example the average waiting time and the average time to destination.

According to an example embodiment, the slider element 401 may be configured for indicating a target level for the average waiting time, for example in a system configured to minimize or provide a sufficiently low energy consumption. The target level for average waiting time may be set to be a decreasing function of the preference parameter value x. The target level function for the waiting time, WT(x), may for example take the following values: WT(0)=infinity, WT(0.5) =20 s, and WT(1)=0. The set of candidate control parameters may be therefore determined based on a function of the preference parameter value. In this example, the set of control parameters may comprise a single waiting time target, for example 20 s. Alternatively, or additionally, a slider element 401 may be configured for indicating the average journey time in a similar fashion.

At 306, the preference elicitor 205 may obtain a simulation result of the passenger traffic group system 201 based on the set of candidate control parameters. The preference elicitor 205 may for example send at least one simulation request to the passenger traffic group simulator 206. The simulation request may comprise the set of candidate control parameters.

According to an example embodiment, the preference elicitor 205 and passenger traffic group simulator 206 may reside within a single control device, such as for example apparatus 100. Alternatively, simulator 206 may be located at a remote server that may be accessed by preference elicitor 205 over a network. The passenger traffic group simulation may be for example performed at a centralized simulation server, which may be used for simulating a plurality of passenger traffic group systems or buildings and include a plurality of passenger traffic group models. Therefore, the simulation request may further comprise an identifier and/or a type of the passenger traffic group system to be simulated.

At 307, the passenger traffic group simulator 206 may perform the simulation, for example in response to receiving the simulation request from the preference elicitor 205. The simulator 206 may for example run the computational model of the passenger traffic system 201 using the received set of candidate control parameters as an input. The simulator may further use the system data 208 of the passenger traffic system 201, for example a traffic profile, as another input. Therefore, obtaining the simulation result may be based on the at least one candidate control parameter and/or at least a traffic profile of the passenger traffic group system. Alternative to running the simulator 206, a surrogate model fitted to simulation results may be used to obtain the simulation result. A benefit of using the surrogate model is that based on the at least one candidate control parameter and/or at least a traffic profile of the passenger traffic group system 201, the simulation result estimated result may be obtained based on the surrogate model, thereby bypassing the computationally more expensive and time consuming simulation by simulator 206.

Based on the performed simulation, the simulator obtains the simulation result, which may comprise various information describing operation of the system. For example, the simulator may provide as an output an estimate of at least one of an average waiting time, a distribution of the waiting time, an average time to destination, the distribution of the time to destination, or an energy consumption of the system. The simulator 206, or the preference elicitor 205, may be further configured to generate at least one representative of the simulation result, for example a graphical illustration of the simulation result such that the user can easily observe behavior of the system with the input user preference parameter(s).

At 308, the passenger traffic group simulator 206 may send a simulation report to the preference elicitor 205. The simulation report may comprise the simulation result and/or any representatives thereof. The preference elicitor 205 may receive the simulation report from the simulator 206. Receiving the simulation report may be part of obtaining the simulation result.

At 309, the preference elicitor 205 may output at least one representative of the operation of the passenger traffic group system based on the simulation result. Outputting the at least one representative may comprise displaying, or causing display of, the at least one representative to the user. For example, the user interface 400 may further comprise an illustration of the at least one representative. For example, the user interface 400 may comprise an element 404 that indicates the average waiting time (20 s) and the distribution of the waiting times for different passengers. The user interface 400 may comprise an element 405 that indicates the average time to destination (80 s) and the distribution of the time to destination for different passengers. The user interface 400 may comprise an element 406 that indicates the energy consumption. Alternatively, or additionally, any other suitable representatives of the operation of the passenger traffic system 201 may be provided. Based on the at least one representative, the user can easily observe behavior of the passenger traffic group system 201 with the input user preferences.

At 310, the preference elicitor 205 may determine whether the user accepts the candidate control parameters and/or the simulation result. An indication of user acceptance may be received for example via a user interface. The preference elicitor 205 may request the user to provide acceptance, for example based on displaying a query to the user at user interface 400.

At 311, the preference elicitor 205 may send the set of candidate control parameters to the passenger traffic group controller 202, for example in response to receiving user acceptance of the set of candidate control parameters. The set of candidate control parameters may be sent to the passenger traffic group controller 202 for configuration at the passenger traffic group system 201.

At 312, the passenger traffic group controller 202 may provide control input to the passenger traffic system 201, for example in order to configure the set of accepted candidate control parameters at the passenger traffic system. The accepted set of accepted candidate control parameters received from preference elicitor 205 may be delivered for example as control parameters 212 to the call allocation function 203 of the passenger traffic group controller 202. The call allocation function 203 may thereafter determine call allocations for the passenger traffic system 201 based on the accepted candidate control parameters received from the preference elicitor 205.

If no user acceptance is received at 310, the procedure may move back to operation 304, where the preference elicitor 205 may receive an indication of at least one second user preference. For example, after observing the simulated behavior of the passenger traffic system with the previous user preference, the user may decide to update the value of the preference parameter, for example by moving slider element 401. Operations 304 to 311 may then be performed based on the received at least one second user preference.

At 305, the preference elicitor may determine a second set of candidate control parameters for the passenger traffic group system, for example in response to the at least one second user preference for the passenger traffic group system.

At 306, the preference elicitor may obtain a second simulation result of the passenger traffic group system based on the second set of candidate control parameters.

At, 309 the preference elicitor 205 may output at least one second representative of the operation of the passenger traffic group system based on the second simulation result.

At 310, the preference elicitor 205 may determine whether the user accepts the second set of candidate control parameters and/or the second simulation result.

If the user does not accept the second set of candidate control parameters and/or the second simulation result, the procedure may move back the 304 for receiving another update of the user preference parameter. Operations 304 to 310 may be repeated until receiving user acceptance.

Figure 5:
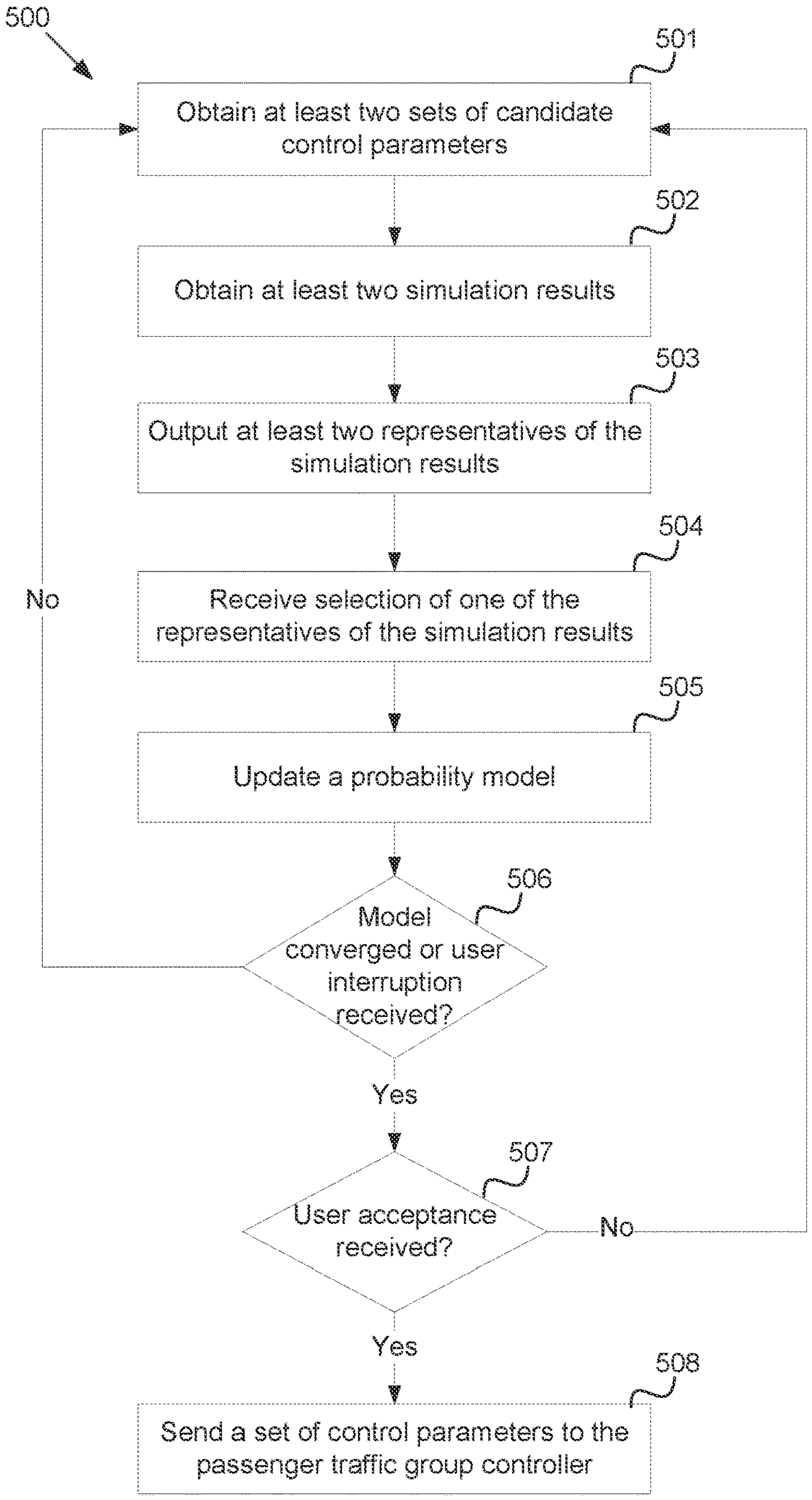
FIG. 5 illustrates an example of a method for eliciting preferences for a passenger traffic group system based on user selection, according to an example embodiment.

FIG. 5 illustrates an example of a method 500 for eliciting preferences for a passenger traffic group system based on comparison of alternatives, according to an example embodiment. The comparison based preference elicitor may be based on a sequential procedure where the user is requested to rank two or more alternative outcomes. An algorithm may be then used to determine a set of control parameters that matches the user's answers. The user may have an underlying preference parameter, which the user may not even be aware of, and the choices of the user may depend on this underlying parameter following a probabilistic model. The model describes the probability of choosing the selected alternative from the set of alternative outcomes associated with different sets of control parameters. The underlying preference parameter may be estimated for example by maximizing this probability. Alternatively, a Bayesian model where there is a probability distribution over the control parameter sets may be also used. Alternatively, a maximum likelihood methods may be applied. An advantage of the Bayesian approach is that it allows taking prior information into account. The probability model may be associated with sets of control parameters. The preference elicitor 205 may be configured to initiate the probability model. The probability model may be initiated for example by setting an equal probability for the sets of control parameters, or by any other suitable means.

At 501, the preference elicitor 205 may determine at least two sets of candidate control parameters for the passenger traffic group system 201. For example, the preference elicitor may select the sets of candidate control parameters from a plurality of preconfigured sets of control parameters, or the preference elicitor may randomly generate the at least two sets of candidate control parameters.

At 502, the preference elicitor 205 may obtain at least two simulation results of the passenger traffic group system based on the at least two sets of candidate control parameters. Obtaining the simulation results may be performed similar to what is described in connection with operations 306 and 308 of FIG. 3, for example based on sending at least one simulation requests comprising the sets of candidate control parameters and receiving simulation report(s) accordingly.

At 503, the preference elicitor may output at least two representatives of the operation of the passenger traffic group system based on the at least two simulation results. Outputting the at least two representatives may comprise displaying, or causing display of, the at least two representatives to the user.

Figure 6:
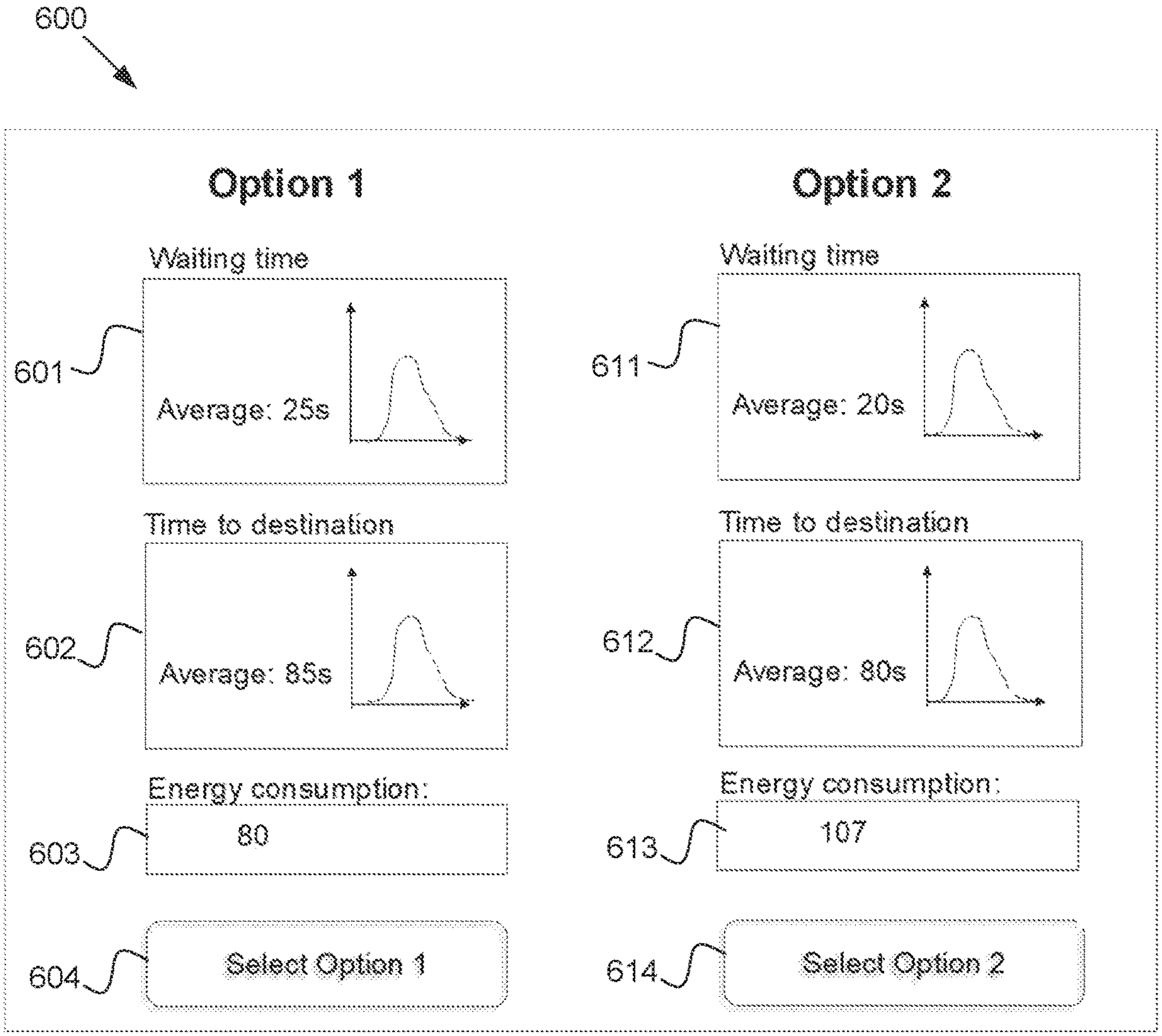
FIG. 6 illustrates an example of a configuration of a user interface configured for selecting preferences for a passenger traffic group system, according to an example embodiment.

FIG. 6 illustrates an example of a user interface 600 configured for providing user preferences as selection between alternatives, according to an example embodiment. The user interface may comprise one or more first user elements 601, 602, 603, comprising representatives of the operation of the passenger traffic group system 201 for a first set of candidate control parameters. The user interface may further comprise one or more second user elements 611, 612, 613, comprising representatives of the operation of the passenger traffic group system 201 for a second set of candidate user parameters. The elements may for example illustrate at least one of: waiting time 601, 611, for example as average waiting time and/or a distribution of waiting time; the time to destination 602, 612, for example as average time to destination and/or a distribution of times to destination; or energy consumption 603, 613.

The user interface 600 may further comprise user interface elements for selecting or ranking the at least two alternatives. The user interface 600 may for example comprise buttons 604, 614 for selecting one of the alternatives. Therefore, the user is enabled to provide an indication of user preference as a selection between the at least two alternatives.

At 504, the preference elicitor 205 may receive selection of one of the alternatives. The alternatives may for example comprise the representatives of the simulation results. If there are more than two alternatives, the user may also select more than one preferred alternative. The indication of the at least one user preference may comprise a selection from the at least two representatives of the simulation results.

At 505, the preference elicitor 205 may update the probability model based on the selection from the at least two representatives of the at least two simulation results. For example, in response to receiving an indication of a selected alternative, the probability of preference parameter(s) that imply a high likelihood of selecting this alternative may be increased in the probability model. Furthermore, the probability of preference parameter(s) that imply a smaller likelihood of selecting this alternative may be decreased accordingly.

At 506, the preference elicitor 205 may determine whether the probability model has converged or if the user wants to quit. For example, the preference elicitor 205 may determine whether at least the probability model satisfies at least one convergence criterion. The convergence criterion may also comprise other criteria such as for example a number of steps taken. Therefore, the convergence criterion may not be based on the updated probability distribution alone. If the at least one convergence criterion is met, the preference elicitor 205 may select a set of a set of control parameters based on the probability model. For example, a set of control parameters that maximizes the probability function, or provides a sufficiently high value of the probability mode may be selected.

Alternatively, or additionally, at 506 the preference elicitor 205 may determine whether the user wants to quit, for example based on whether a user interruption is received. If no user interruption is received and/or the probability mode has not converged, the method may proceed back to operation 501 to obtain another two sets of candidate parameters for ranking by the user. If the user wants to quit the iterative process of ranking alternative outcomes, the user may provide a user interruption, for example by activating an interrupt element at user interface 600 (not shown).

If the convergence criterion is met and/or the user interruption has been received, the preference elicitor 205 may determine whether user accepts the selected set of control parameters or the underlying user preference. An indication of user acceptance may be received for example via a user interface. The preference elicitor 205 may request the user to provide acceptance, for example based on displaying a query to the user at user interface 600.

At 508, the preference elicitor 205 may send the set of control parameters to a passenger traffic group controller 202 for configuration at the passenger traffic group system. The set of control parameters may comprise the selected and/or accepted set of control parameters.

Figure 7:
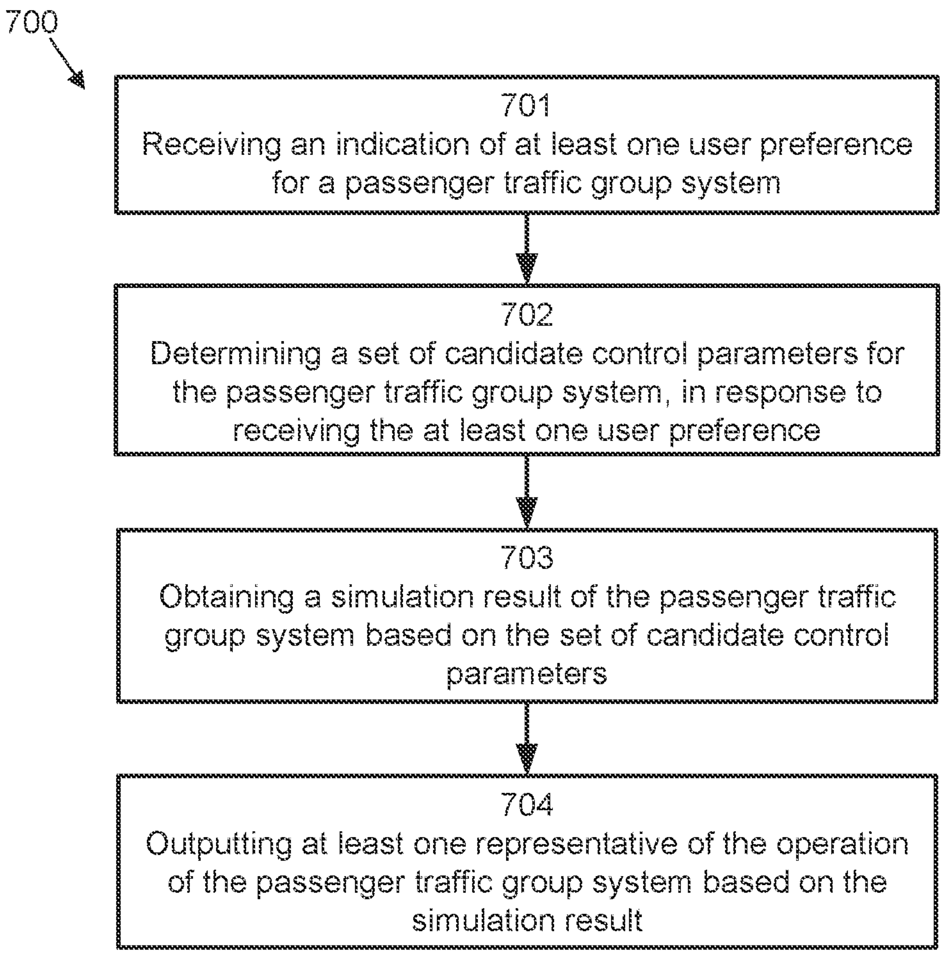
FIG. 7 illustrates an example of a method for eliciting preference (s) for a passenger traffic group system, according to an example embodiment.

FIG. 7 illustrates an example of a method for eliciting preference (s) for a passenger traffic group system, according to an example embodiment.

At 701, the method may comprise receiving an indication of at least one user preference for a passenger traffic group system.

At 702, the method may comprise determining a set of candidate control parameters for the passenger traffic group system, in response to receiving the at least one user preference.

At 703, the method may comprise obtaining a simulation result of the passenger traffic group system based on the set of candidate control parameters.

At 704, the method may comprise outputting at least one representative of the operation of the passenger traffic group system based on the simulation result.

Further features of the method directly result for example from functionalities of the preference elicitor 205, the passenger traffic group simulator 206, the passenger traffic group controller 202, and/or the passenger traffic system 201 as described throughout the specification and in the appended claims, and are therefore not repeated here. Different variations of the methods may be also applied, as described in connection with the various example embodiments.

An apparatus, such as for example a control device of a passenger traffic group system, may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory comprising program code, which when executed by the at least one processor, cause performance of any aspect of the method(s).

Referring back to FIG. 1, the apparatus 100 may comprise preference elicitor 205. The apparatus may further comprise the passenger traffic group simulator 206. Alternatively the simulator 206 may be embodied as a separate device. The apparatus 100 may further comprise the passenger traffic group controller 202. The preference elicitor 205 may be further embodied as program code 103 configured to cause performance of method 700, when executed by processor 101. The at least one processor 101 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 102 may be configured to store, for example, computer program code 103 or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.). The transceiver 104 may be configured to enable the apparatus to transmit and/or receive information, for example control data packets or user data packets to/from other devices or network functions.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 103 comprised, for example, in the memory 102.

The functionality described herein may be performed, at least in part, by one or more computer program product components such as software components. According to an example embodiment, the apparatus comprises a processor or processor circuitry, such as for example a microcontroller, configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Any range or device value given herein may be extended or altered without losing the effect sought. Also, any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual embodiments, those skilled in the art could make numerous alterations to the disclosed example embodiments without departing from scope of this specification.

The invention claimed is:

1. A method, comprising the steps of:

receiving an indication of at least one user preference for a passenger traffic group system;

determining a set of candidate control parameters for the passenger traffic group system, in response to the step of receiving the indication of the at least one user preference;

obtaining a simulation result of the passenger traffic group system based on the set of candidate control parameters;

outputting at least one representative of the operation of the passenger traffic group system based on the simulation result, wherein the indication of the at least one user preference comprises an input of a relative importance between energy consumption and at least one passenger traffic performance indicator, and input of the relative importance is configured to directly configure weighting coefficients of a multi-objective optimization function; and configuring a passenger traffic group controller with the set of candidate control parameters to provide control input to the passenger traffic group system to perform real-time call allocations in response to receiving a user acceptance of the output at least one representative of the operation of the passenger traffic group system.

2. The method according to claim 1, further comprising the step of:

sending the set of candidate control parameters to a passenger traffic group controller for configuration at the passenger traffic group system, in response to receiving a user acceptance of the set of candidate control parameters.

3. The method according to claim 1, further comprising the step of:

iteratively repeating the steps of receiving the indication of the at least one user preference, determining the set of candidate control parameters, obtaining the simulation result, and outputting the at least one representative of the simulation result until receiving the user acceptance.

4. The method according to claim 1, wherein the indication of the at least one user preference is received based on a graphical user interface comprising at least one user interface element for inputting a relative importance of at least two user preference parameters.

5. The method according to claim 4, wherein the user interface element comprises a slider element.

6. The method according to claim 1, wherein the outputting the at least one representative of the operation of the passenger traffic group system comprises displaying the at least one representative of the operation of the passenger traffic group.

7. The method according to claim 1, wherein the at least one representative of the operation of the passenger traffic group system comprises at least one of:

an average waiting time, a distribution of waiting time, an average time to destination, a distribution of time to destination, or an energy consumption.

8. The method according to claim 1, wherein the obtaining the simulation result comprises sending a simulation request to a simulation server and receiving the simulation result from the simulation server.

9. The method according to claim 1, wherein the simulation result is obtained based on the set of candidate control parameters and at least a traffic profile of the passenger traffic group system.

10. The method according to claim 1, wherein the set of candidate control parameters comprises weights of a linear utility function.

11. The method according to claim 1, further comprising the step of determining the set of candidate control parameters based on the at least one user preference.

12. The method according to claim 1, further comprising the steps of:

determining at least two sets of candidate control parameters for the passenger traffic group system;

obtaining at least two simulation results of the passenger traffic group system based on the at least two sets of candidate control parameters; and outputting at least two representatives of the operation of the passenger traffic group system based on the at least two simulation results, wherein the indication of the at least one user preference comprises a user selection from the at least two representatives of the simulation at least two results.

13. The method according to claim 1, further comprising the steps of:

initiating a probability model associated with sets of control parameters; and updating the probability model based on the user selection from the at least two representatives of the at least two simulation results.

14. The method according to claim 13, further comprising the steps of:

determining whether the probability model satisfies at least one convergence criterion;

selecting a set of control parameters based on the probability model; and sending the set of control parameters to a passenger traffic group controller for configuration at the passenger traffic group system.

15. A computer program embodied on a non-transitory computer readable medium and comprising program code configured to, when executed by at least one processor, cause an apparatus at least to perform the method of claim 1.

16. The method according to claim 1, further comprising the steps of:

receiving a subsequent user input comprising at least one of an acceptance of the set of candidate control parameters, and a modification of the relative importance; and iteratively repeating said steps of determining a set of candidate control parameters, obtaining a simulation result and outputting at least one representative using the modification.

17. An apparatus, configured to:

receive an indication of at least one user preference for a passenger traffic group system;

determine a set of candidate control parameters for the passenger traffic group system, in response to receiving the indication of the at least one user preference;

obtain a simulation result of the passenger traffic group system based on the set of candidate control parameters; and output at least one representative of the operation of the passenger traffic group system based on the simulation result, wherein the indication of the at least one user preference comprises an input of a relative importance between energy consumption and at least one passenger traffic performance indicator, and input of the relative importance is configured to directly configure weighting coefficients of a multi-objective optimization function, and wherein the apparatus includes a passenger traffic group controller, the passenger traffic group controller being configured with the set of candidate control parameters to provide control input to the passenger traffic group system to perform real-time call allocations in response to receiving a user acceptance of the output at least one representative of the operation of the passenger traffic group system.

18. The apparatus according to claim 17, further configured to:

send the set of candidate control parameters to a passenger traffic group controller for configuration at the passenger traffic group system, in response to receiving a user acceptance of the set of candidate control parameters.

19. The apparatus according to claim 17, further configured to:

iteratively repeat the receiving the indication of the at least one user preference, the determining the set of candidate control parameters, the obtaining the simulation result, and the outputting the at least one representative of the simulation result until receiving the user acceptance.

20. The apparatus according to claim 17, further configured to receive the indication of the at least one user preference based on a graphical user interface comprising at least one user interface element for inputting a relative importance of at least two user preference parameters.

21. The apparatus according to claim 20, wherein the user interface element comprises a slider element.

22. The apparatus according to claim 17, wherein the outputting the at least one representative of the operation of the passenger traffic group system comprises displaying the at least one representative of the operation of the of the passenger traffic group.

23. The apparatus according to claim 17, wherein the at least one representative of the operation of the passenger traffic group system comprises at least one of:

an average waiting time, a distribution of waiting time, an average time to destination, a distribution of time to destination, or an energy consumption.

24. The apparatus according to claim 17, wherein the obtaining the simulation result comprises sending a simulation request to a simulation server and receiving the simulation result from the simulation server.

25. The apparatus according to claim 17, wherein the simulation result is obtained based on the set of candidate control parameters and at least a traffic profile of the passenger traffic group system.

26. The apparatus according to claim 17, wherein the set of candidate control parameters comprises weights of a linear utility function.

27. The apparatus according to claim 17, further configured to:

determine the set of candidate control parameters based on the at least one user preference.

28. The apparatus according to claim 17, further configured to:

determine at least two sets of candidate control parameters for the passenger traffic group system;

obtain at least two simulation results of the passenger traffic group system based on the at least two sets of candidate control parameters; and output at least two representatives of the operation of the passenger traffic group system based on the at least two simulation results, wherein the indication of the at least one user preference comprises a user selection from the at least two representatives of the simulation at least two results.

29. The apparatus according to claim 17, further configured to:

initiate a probability model associated with sets of control parameters; and update the probability model based on the user selection from the at least two representatives of the at least two simulation results.

30. The apparatus according to claim 29, further configured to:

determine whether the probability model satisfies at least one convergence criterion;

select a set of control parameters based on the probability model; and send the set of control parameters to a passenger traffic group controller for configuration at the passenger traffic group system.

31. The apparatus according to claim 17, further configured to:

receive a subsequent user input comprising at least one of an acceptance of the set of candidate control parameters, and a modification of the relative importance; and iteratively repeat operations of determining a set of candidate control parameters, obtaining a simulation result and outputting at least one representative using the modification.

* * * * *